Dec. 27, 1949   C. L. BEARD   2,492,515
REEL
Filed Dec. 23, 1948
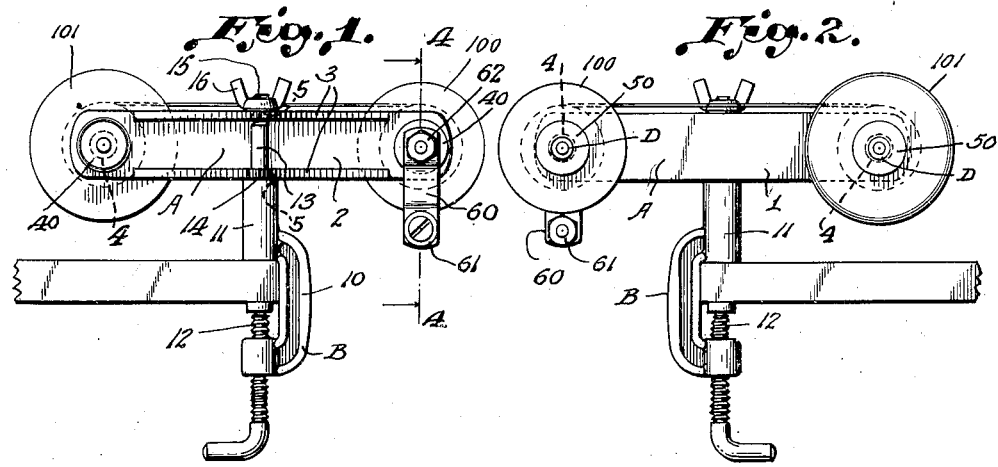
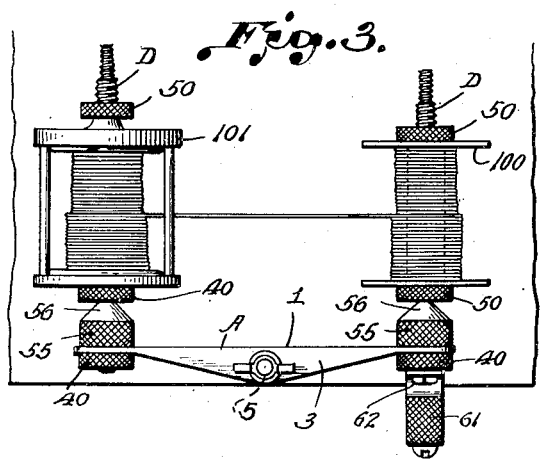
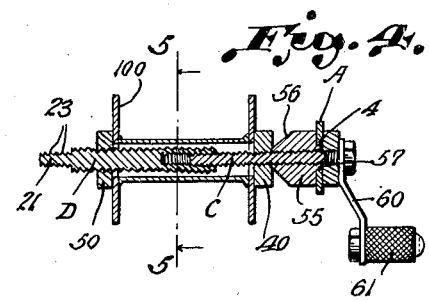
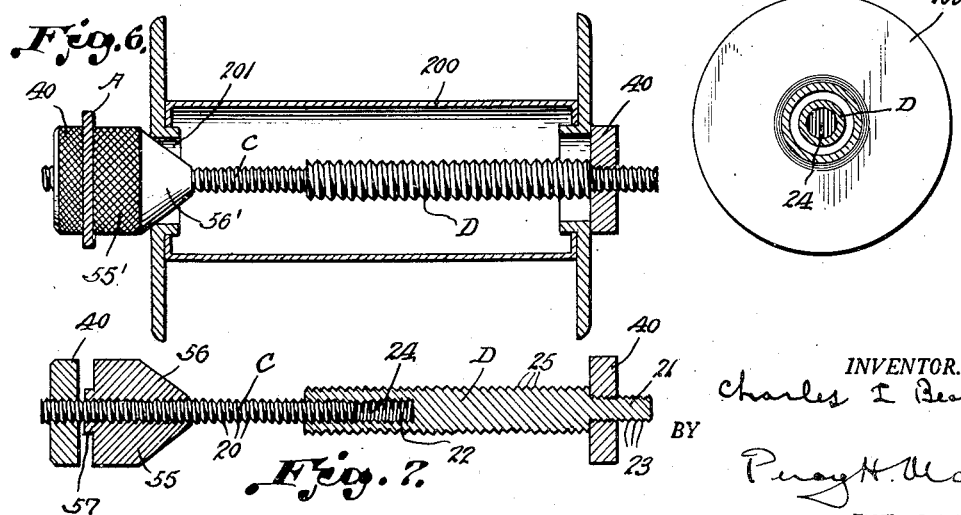
INVENTOR.
Charles L. Beard
BY
Percy H. Moor
ATTORNEY.

Patented Dec. 27, 1949

2,492,515

UNITED STATES PATENT OFFICE 2,492,515

REEL

Charles L. Beard, Lancaster, Pa.

Application December 23, 1948, Serial No. 66,891

4 Claims. (Cl. 242—106)

This invention relates to new and useful improvements in reels and more particularly and specifically to drying reel apparatus for fishing tackle and like equipment.

The primary object of this invention resides in the provision of a supporting apparatus capable of mounting plural reels in opposed cooperative positions whereby line may be easily and quickly exchanged therebetween.

Another important object of this invention lies in the provision of a support for plural reels which embodies a novel and improved structure permitting easy and quick assembly and disassembly of the support.

Still a further improvement and advantage inherent in this invention is the specific and unique arrangement of parts and methods of securing the various parts in operable positions.

Still another important object of this inventions lies in the various functions to which this invention is adaptable. It is useful in the initial transferal of line from the conventional spool on which it is purchased to the reel which will be used in fishing or the like. In addition, the support is useful in mounting a fishing reel and a drying, or storage, reel, and the operation of the working structures of the support to wind line from one reel to the other to permit drying of the line intermediate the reels.

A further advantage and prime object of this invention resides in the provision of a line winder reel apparatus which is provided with a supporting clamp permitting the entire assembly to be mounted on the side of a boat, a tackle box, a chair arm, and like places of convenience. In addition the structure of the reel supporting elements of the winder assembly permit an interchange of the parts to permit them to be readily adapted to reels and spools of varied central bore diameters.

Still further improvements and advantages of this invention will become readily apparent to those skilled in the art when the following description is read in the light of the accompanying drawings.

In the drawings:

Fig. 1 is a side elevation of the assembly attached to a supporting base.

Fig. 2 is a side view taken at 180 degrees from Fig. 1.

Fig. 3 is a top plan view of Fig. 1.

Fig. 4 is a section taken on the line 4—4 of Fig. 1.

Fig. 5 is a vertical section taken on the line 5—5 of Fig. 4.

Fig. 6 is an enlarged partial section of a modified form of the invention.

Fig. 7 is a sectional view of the elements shown in Fig. 6.

Referring now to the drawings in which like characters indicate similar parts throughout, A designates an elongated, flat support bar provided with one flat face 1, and the second face 2, oppositely disposed to 1, being provided integrally with perpendicular, triangular shaped flanges 3 extending along the longitudinal marginal edges of the bar with the apexes thereof aligning transverse the bar on the center-line thereof.

In addition, the support bar A is provided at each end thereof with like circular holes 4 extending therethrough, and the flanges 3 are provided with aligned circular holes 5.

A supporting clamp B is provided with the support bar A and consists of a conventional C-shaped clamp 10 provided with an elongated solid extension 11 projecting in opposition to the moving clamp screw 12, and formed integrally with the extension 11, and extending axially therefrom is a second extension 13. The extension 13 forms a shoulder 14 at its joinder with the extension 11, and it is additionally provided with threads 15 about the extended end thereof adapting it to receive a wing nut 16 thereon. In assembly, the C-shaped clamp is disposed vertically below the support bar A, and the smaller extension 13 is disposed upwardly through the aligned holes 5 in the flanges 3 until the shoulder 14 abuts with the under surface of the lower flange. The wing nut 16 is then applied to the threaded end 15 of the extension 11 where it projects beyond the other flange, and the C clamp is secured by the opposed gripping forces of the wing nut 16 and the shoulder 14 thus providing a rigid, removable support for the support bar A which is rigidly supported in a horizontal plane as shown.

Provided with the support bar A are a plurality of threaded shafts. These shafts are divided into two groups. The first group C is composed of small diameter shafts provided throughout their length with screw threads 20, while the second group D comprises a plurality of large diameter shafts provided at one end with a short extension 21 of a reduced diameter equal to that of the shafts of the first group. The second end of these shafts D is provided with an axial bore 22 extending for a spaced distance inwardly thereof. The extension 21 is threaded, 23, to correspond to the smaller shafts C, and the axial bore is tapped, 24, to receive the small shafts C or an extension 21, and the larger shafts D are threaded, 25, throughout their length.

Likewise provided with these "arbor" shafts C and D is a plurality of circumferentially knurled collars 40, adapted to be threaded on the smaller shafts C, and other collars 50 adapted to be threaded on the larger shafts D. Also provided are two additional collars 55 each provided with one tapered face 56 and a raised circular boss 57 on the face opposed to the taper. To complete the assembly of the parts, there is provided a handle 60 having a knurled finger portion 61 and nut 62 to retain the handle in the assembly about to be defined.

To begin the assembly of the shafts on the support bar A one of the smaller shafts C is disposed through one of the holes 4 in the bar, and, on the side of the bar adjacent the face 2, a small collar 40 is threaded on the shaft and the handle is locked between the collar and the lock nut 62. The collar 40 is disposed adjacent the face 2 of the support bar. One of the tapered collars 55 is threaded on the shaft where it extends beyond the bar A. The boss 57 is disposed toward the face 1 of the bar A so that it extends through the hole 4 therein to bear against the collar 40 and rotatably lock the shaft horizontally on the support bar.

Then, in the preferred form of the invention, a collar 40 is threaded on the small shaft to engage the tapered face 56 of the collar 55. The hollow bored end 24 of a large shaft D is threaded on the extended portion of the smaller shaft. Then a reel 100 is slidably telescoped over the large shaft to abut with the collar 40, and a larger collar 50 is then threaded on the large shaft to abut the outer end of the reel and lock it between the collars 40 and 50 for rotation therebetween with the shafts.

The assembly of the second shaft for the mounting of the second reel 101 is the same as that just described except for the normal omission of the handle assembly, 60 through 62.

The modification disclosed in Figs. 6 and 7 is an optional assembly of the shafts and collars so that oversized or overlength reel 200 may be mounted. In this form the inner, smaller collar 40 is omitted so that the hollow bore 201 of the reel 200 may engage the tapered face 56' of the collar 55'. Likewise, at the outer end, a small collar 40' replaces the larger collar 50, and the small collar is threaded on the small extension 21 of the large shaft D to abut with the reel 200 and clamp it with the tapered collar 55'.

It can be easily seen that this assembly of parts, and the parts comprising the resultant structure, can be readily adapted to vary the assembly to meet various requirements in the varied possible uses for which this novel structure may be employed.

It can also be readily seen that the provided structure spaces the reels at such a distance to permit the line being transferred to be wiped between the reels. It can also be seen that additional shafting can be supplied to permit one or both of said shafts to be extended to accommodate a plurality of reels.

It is to be understood that this invention is not to be limited to the specific disclosures of the drawings and description, but it is to be limited only within the scope of the hereinafter appended claims.

What I claim is:

1. A device of the character described comprising, an elongated support bar, a means including a removable clamp for mounting said support bar in a horizontal plane, elongated threaded shafts, collars rotatably locking said shafts in extended parallel spaced relationship from said support bar, additional collars threaded on said extended shafts for locking spool-type reels on said shafts for rotation therewith, and means including a handle on one of said shafts for rotating the same.

2. A device of the character described comprising, an elongated support bar provided with longitudinally spaced openings therein, threaded shafts extended through said openings and rotatably locked on said bar by collars threaded on said shafts on opposite sides of said support bar, means including a removable clamp for mounting said bar in a horizontal plane, enlarged threaded shafts provided with internally threaded bores extending inwardly of the ends thereof, said enlarged shafts threadedly receiving the extended ends of said smaller shafts in the bores thereof, reels mounted slidably on said enlarged shafts, and additional collars threaded on said enlarged shafts to lock said reels against the adjacent small shaft collars for rotation with said shafts.

3. A structure as defined in claim 2 wherein, those collars on said small shafts abutting and locking said reel on said shaft for rotation therewith are provided with conical, tapered faces to engage in the spool bore of said reels in the manner described.

4. A structure as defined in claim 2 wherein, longitudinal flanges are formed on said support bar, aligned openings are formed in said flanges on the transverse center-line of said support bar, and said mounting means includes a C-clamp provided with an extended portion, and said extended clamp portion is provided with a threaded extremity and a shoulder spaced from said threaded extremity for removable engagement in said flange openings in the manner described.

CHARLES L. BEARD.

REFERENCES CITED

The following references are of record in the file of this patent:

UNITED STATES PATENTS

| Number | Name | Date |
| --- | --- | --- |
| 70,113 | Phillips | Oct. 22, 1867 |
| 2,007,705 | Brugger | July 9, 1935 |

FOREIGN PATENTS

| Number | Country | Date |
| --- | --- | --- |
| 175,725 | Great Britain | Feb. 17, 1922 |